US 7,076,557 B1

(12) United States Patent
LaMacchia et al.

(10) Patent No.: US 7,076,557 B1
(45) Date of Patent: Jul. 11, 2006

(54) APPLYING A PERMISSION GRANT SET TO A CALL STACK DURING RUNTIME

(75) Inventors: Brian A. LaMacchia, Seattle, WA (US); Gregory Darrell Fee, Kirkland, WA (US); Loren M. Kohnfelder, Bellevue, WA (US); Ashok Cholpady Kamath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 740 days.

(21) Appl. No.: 09/613,032

(22) Filed: Jul. 10, 2000

(51) Int. Cl.
*G06F 15/16* (2006.01)
(52) U.S. Cl. ...................................... 709/229; 713/200
(58) Field of Classification Search ................ 713/200; 709/102; 707/103
See application file for complete search history.

(56) References Cited

U.S. PATENT DOCUMENTS

| 5,915,085 | A |   | 6/1999  | Koved ........................ 395/186 |
|-----------|---|---|---------|---------------------------------------|
| 5,958,050 | A |   | 9/1999  | Griffin et al. ................ 713/200 |
| 5,978,484 | A |   | 11/1999 | Apperson et al. ............. 380/25 |
| 6,044,466 | A |   | 3/2000  | Anand et al. ................ 713/200 |
| 6,044,467 | A | * | 3/2000  | Gong ......................... 713/200 |
| 6,138,238 | A | * | 10/2000 | Scheifler et al. ............. 713/200 |
| 6,345,361 | B1| * | 2/2002  | Jerger et al. ................. 713/200 |
| 6,389,540 | B1| * | 5/2002  | Scheifler et al. ............. 713/200 |

(Continued)

FOREIGN PATENT DOCUMENTS

WO     WO 99/30217     6/1999

OTHER PUBLICATIONS

"Decentralized Trust Management", by M. Blaze, J. Feigenbaum, J. Lacy, in Proceedings of the 1996 IEEE Symposium on Security and Privacy, pp. 164-173. Also available as a DIMACS Technical Report. This paper describes PolicyMaker. Available in Postscript at http://www.research.att.com/~jf/pubs/oakland96proc.ps.

(Continued)

*Primary Examiner*—William C. Vaughn, Jr.
*Assistant Examiner*—Kyung Hye Shin
(74) *Attorney, Agent, or Firm*—Merchant & Gould P.C.

(57) ABSTRACT

A system and method determine whether a called code frame has a requested permission available to it, so as to be able to execute a protected operation. A code frame is contained within a code assembly received from a remote or local resource location. A policy manager generates a permission grant set containing permission grant objects associated with the code assembly. Both the permission grant set and the code assembly are loaded into a runtime call stack for runtime execution of one or more code frames. Calls to other code frames may involve loading additional code assemblies and permission grant sets into the runtime call stack. In order for a called code frame to perform a protected operation, the code frame demands a requested permission from its calling code frame and all code frames preceding the calling code frame on the runtime call stack as part of a stack walk operation. If the calling code frame and the preceding call frames can satisfy the requested permission, the called code frame can perform the protected operation (absent stack overrides). Otherwise, a security exception is thrown and the called code frame is inhibited from performing the protected operation (absent stack overrides). Stack overrides may be employed to dynamically modify the stack walk operation. To increase performance, a stack walk may be avoided by caching an intersection of the permission grants of all code assemblies in the application.

46 Claims, 8 Drawing Sheets

U.S. PATENT DOCUMENTS 6,526,513 B1 *  2/2003  Shrader et al. ............. 713/200
6,735,758 B1 *  5/2004  Berry et al. ................ 717/130

OTHER PUBLICATIONS

"Proceedings of the Sixth International World Wide Web Conference", Santa Clara, CA, Apr. 1997, by Y. Chu, J. Feigenbaum, B. LaMacchia, P. Resnick, M. Strauss, REFEREE: Trust Management for Web Applications. Available from http://www.farcaster.com/papers/www6-referee/index.htm.

"The Role of Trust Management in Distributed System Security", M. Blaze, J. Feigenbaum, J. Ioannidis, A. Keromytis, Secure Internet Programming: Security Issues for Distributed and Mobile Objects, Lecutre Notes in Computer Science, vol. 1603, Springer, Berlin, 1999, pp. 185-210. Postscript available from http://www.research.att.com/~jf/pubs/sip99.ps.

"Managing Trust in an Information-Labeling System", European Transactions on Telecommunications, 8 (1997), pp. 491-501. (Special issue of selected papers from the 1996 Amalfi Conference on Secure Communications in Networks.) Postscript from http://www.research.att.com/~jf/pubs/ett97.ps.

"The Evolution of Java Security", by Koved, Nadalin, Neal and Lawson, including information on Java-based systems, IBM.

Information on KeyNote including "The KeyNote Trust-Management System" from RFC 2704, at http://www.cis/upenn.edu/~angelos/keynote.html; and "Using the KeyNote Trust Management Sytem" by Matt Blaze, at http://www.crypto.com/trustmgt/.

"Trust management on the World Wide Web", by Khare and Rifkin, at http://www7.scu.edu.au/programme/posters/1902/com1902.htm.

"Compliance Checking in the PolicyMaker Trust Management System", by Blaze, Feigenbaum and Strauss, AT&T Labs-Research.

International Search Report for PCT/US01/16057.

International Search Report for PCT/US01/16127.

Anand, R. et al.., "A Flexible Security Model for Using Internet Content," Proceedings of the 16th Symposium on Reliable Distributed Systems. SRDS '97, Durham, NC, Oct. 22-24, 1997 & Proceedings of the Symposium on Reliable Distributed Systems, Los Alamitos,CA: IEEE Computer Soc, US, Oct. 22, 1997.

"Logically Extensible Privilege Control Set," IBM Technical Disclosure Bulletin, IBM Corp., New York, NY, vol. 34, No. 7B, Dec. 1, 1991.

* cited by examiner

APPLYING A PERMISSION GRANT SET TO A CALL STACK DURING RUNTIME

CROSS-REFERENCE TO RELATED APPLICATIONS

The present application is related to U.S. patent application Ser. No. 09/598,534, entitled EVIDENCE-BASED SECURITY POLICY MANAGER, U.S. patent application Ser. No. 09/599,015, entitled FILTERING A PERMISSION SET USING PERMISSION REQUESTS ASSOCIATED WITH A CODE ASSEMBLY, and U.S. patent application Ser. No. 09/598,814, entitled EVALUATING INITIALLY UNTRUSTED EVIDENCE IN AN EVIDENCE-BASED SECURITY POLICY MANAGER, assigned to the Assignee of the present invention.

TECHNICAL FIELD

The invention relates generally to computer security, and more particularly to applying a grant set to a runtime call stack.

BACKGROUND OF THE INVENTION

Security risks, such as allowing unauthorized access to a user's system, are inherent with many on-line activities. Therefore, security mechanisms have been developed to protect users' systems. For example, a user may download an on-demand application from the Internet and execute the application from within the browser. To prevent an unauthorized access to the user's system resources (e.g., a directory on the user's hard disk), the user's system is protected by "sandbox" security that is enforced within the browser environment. Sandbox security involves a limited, secure area of computer memory in which an application may execute, so that the application is prevented from accessing system resources that reside outside of the secure area.

In some circumstances, however, a user may wish to allow a downloaded application controlled access to certain resources within the user's system. For example, a user may wish to use an on-demand word processing application to generate a document and then save the document to a directory in the user's system.

Existing approaches for providing such applications with secure, controlled access to a user's system are too cumbersome and inflexible. In one method, for example, a security policy is defined within a policy database in which a given application is associated with a permission set. The security policy, in combination with origin information, signature information, and access restrictions, helps define a "trusted" relationship between the application and the user's system.

Consider the following example:

```
grant codeBase "http://www.BobsWidgets.com" signed by
BobsCertificate {
    permission lang.io.FilePermission "/tmp/" "read";
    permission lang.io.FilePermission "/tmp/bwdir/*" "write";
}
```

In the example, an applet from the source location, "www.BobsWidgets.com", is granted certain file access permissions if it is signed with a private key corresponding with a public key contained within BobsCertificate. An applet is traditionally a program designed to be executed from within a browser, rather than directly from within the operating system. The applet is granted permission to read files from the "/tmp" directory on the host system and to create and write to files in the "/tmp/bwdir" directory. Permission to "execute" is another common permission modifier. Other security policy specifications may, for example, grant broad permissions to access any file in any system location, regardless of the application's source or whether the application is unsigned or signed.

Existing approaches, however, fail to provide the flexible and dynamic functionality that is desirable during runtime. In the previously discussed example, a code assembly requests a set of needed permissions ("i.e., requested permissions") from a global security method provided by the runtime environment. As shown, the permissions received by a given code assembly during a given runtime call chain are dictated by two characteristics: (1) the "CodeBase" or origin of the code assembly and (2) any certification received in association with the code assembly. These two characteristics define a "protection domain" in the exemplary approach.

The global security method described in the exemplary approach determines whether the requested permissions have been granted to a code assembly for a given protection domain. In addition, the global security method determines whether preceding code assemblies in the runtime call stack also have the requested permission based on the protection domain of each individual code assembly. The exemplary approach does not, however, allow customized security functionality to be incorporated into the security model. Instead, the approach is static, in that the characteristics that comprise a protection domain are limited to only two parameters, which values are fixed by the security policy.

Moreover, a given code assembly cannot dynamically influence the permissions received by other code assemblies in the call stack. For example, assume a first code assembly, which has been granted a permission to access a given file, calls a second code assembly, which has also been granted permission to access the file by the security policy. The developer of the first code assembly, however, may wish to prevent the second code assembly from accessing the file in this particular call chain. Existing approaches do not provide flexible means for a calling code assembly to dynamically influence the permissions provided to a called code assembly (i.e., so as to preclude the second method from accessing the file in the example).

SUMMARY OF THE INVENTION

In accordance with the present invention, the above and other problems are solved by providing permission request objects and permission grant objects that are dynamically processed within the runtime call stack. A permission request object may perform a stack walk operation checking permissions provided to preceding code assemblies in the stack. Furthermore, permissions may be processed on multiple levels of granularity including the methods, classes, and modules. Moreover, the full stack walk operation may be overridden by stack overrides such as Assert, Deny, and PermitOnly.

In an implementation of the present invention, a method of determining whether a requested permission, requested by a called code frame, is satisfied within a runtime call stack so as to allow the called code frame to perform a protected operation is provided. A permission grant object is associated with a first code assembly in the runtime call stack. A permission request object is created within the called code frame to demand the requested permission. The requested permission from the permission grant object is demanded via the permission request object to allow the called code frame to perform the protected operation. It is determined whether the requested permission is provided in association with the first code assembly by the permission grant object, responsive to the demanding operation. Execution of the called code frame to perform the protected operation is permitted, if the requested permission is provided in association with the first code assembly.

In another implementation of the present invention, a alternative method of determining whether a requested permission, requested by a called code frame, is satisfied within a runtime call stack so as to allow the called code frame to perform a protected operation is provided. A first permission grant object is associated with a first code assembly in the runtime call stack. A second permission grant object is associated with a second code assembly in the runtime call stack. A first intersection of permissions provided by the first permission grant object and the second permission grant object is computed. The first intersection of permissions is recorded to provide a cached permission intersection. The requested permission is demanded. Execution of the called code frame is permitted, if the requested permission is a subset of the cached permission intersection.

In another implementation of the present invention, a runtime system for determining whether a requested permission, requested by a called code frame, is satisfied within a runtime call stack so as to allow the called code frame to perform a protected operation is provided. A first code assembly is loaded into the runtime call stack. A first permission grant object is associated with the first code assembly comprising one or more permissions available to the first code assembly. A first permission request object is created by the called code frame requesting the requested permission from the first permission grant object, wherein the called code frame is permitted to execute to perform the protected operation, if the first permission request object determines that the requested permission is available to the first code assembly.

In yet another implementation of the present invention, an alternative runtime system for determining whether a requested permission, requested by a called code frame, is satisfied within a runtime call stack so as to allow the called code frame to perform a protected operation is provided. A first permission grant object is associated with a first code assembly in the runtime call stack. A second permission grant object is associated with a second code assembly in the runtime call stack. A cache stores an intersection of permissions provided by the first permission grant object and the second permission grant object. Execution of the called code frame is permitted if the requested permission is a subset of the cached permission intersection.

In other implementations of the present invention, articles of manufacture are provided as computer program products. One embodiment of a computer program product provides a computer program storage medium readable by a computer system and encoding a computer program for executing a computer process for determining whether a requested permission, requested by a called code frame, is satisfied within a runtime call stack so as to allow the called to code frame to perform a protected operation. Another embodiment of a computer program product may be provided in computer data signal embodied in a carrier wave by a computing system and encoding the computer program for determining whether a requested permission, requested by a called code frame, is satisfied within a runtime call stack so as to allow the called code frame to perform a protected operation. The computer program product encodes a computer program for executing on a computer system a computer process for determining whether a requested permission, requested by a called code frame, is satisfied within a runtime call stack so as to allow the called code frame to perform a protected operation. A permission grant object is associated with a first code assembly in the runtime call stack. A permission request object is created within the called code frame to demand the requested permission. The requested permission from the permission grant object is demanded via the permission request object to allow the called code frame to perform the protected operation. It is determined whether the requested permission is provided in association with the first code assembly by the permission grant object, responsive to the demanding operation. Execution of the called code frame to perform the protected operation is permitted, if the requested permission is provided in association with the first code assembly.

These and various other features as well as other advantages, which characterize the present invention, will be apparent from a reading of the following detailed description and a review of the associated drawings.

DETAILED DESCRIPTION OF THE INVENTION

Figure 1:
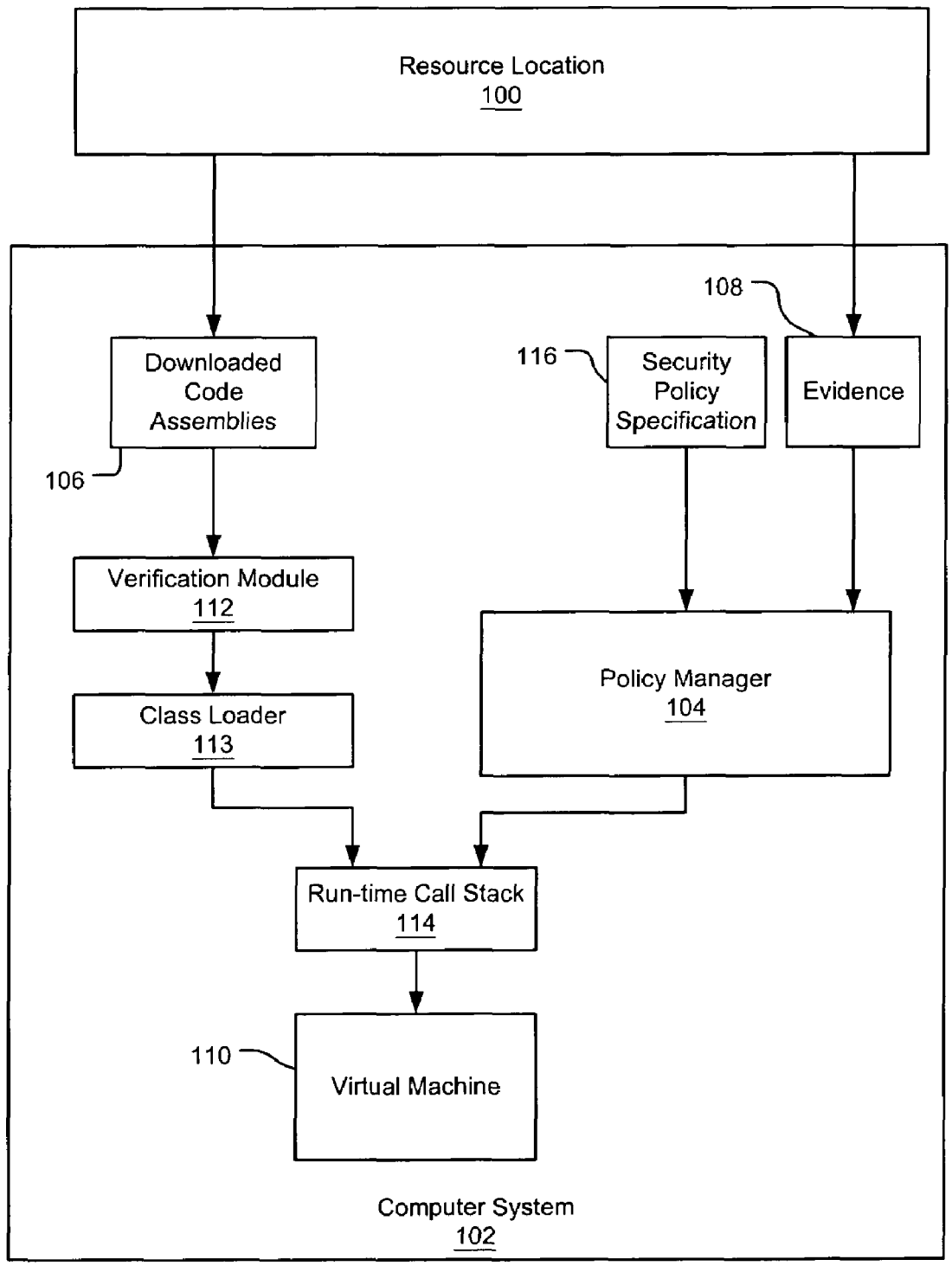
FIG. 1 depicts an evidence-based security policy manager in an embodiment of the present invention.

An embodiment of the present invention determines whether a called code frame has a set of one or more permission (i.e., a requested permission) available to it, so as to be able to execute a protected operation. Typically, a code frame is contained within a code assembly received from a remote resource location (e.g., across the Internet) or local resource location (e.g., a system's hard drive, a network peripheral, or a system-attached peripheral).

A policy manager generates a permission grant set containing permission grant objects associated with the code assembly. Both the permission grant set and the code assembly are loaded into a runtime call stack for runtime execution of one or more code frames. Calls to other code frames may involve loading additional code assemblies and permission grant sets into the runtime call stack. It should be understood that an embodiment of the present invention logically incorporates the permission grant sets into the runtime call stack; however, alternative embodiments may store the permission grants outside the runtime call stack for processing.

In order for a called code frame to perform a protected operation, the code frame instantiates a permission request object and demands a requested permission from its calling code frame and all code frames preceding the calling code frame on the runtime call stack as part of a stack walk operation. If the calling code frame and the preceding call frames can satisfy the requested permission (i.e., can provide the requested permission or a superset of the requested permission from their respective permission grant sets), the called code frame can perform the protected operation (absent stack overrides). Otherwise, a security exception is thrown and the called code frame is inhibited from performing the protected operation (absent stack overrides).

Stack overrides may be employed to dynamically modify the stack walk operation. Exemplary overrides may include without limitation (1) Assert, which asserts that code assemblies preceding the "asserting" code assembly have a specified permission; (2) Deny, which declines a demand for a specified permission, even if the permission is provided in the associated permission grant set; and (3) PermitOnly, which allows only a demand for one or more specified permissions to be satisfied in associated with a given code assembly, regardless of whether other permissions are provided in the associated permission grant set. It should be understood that stack overrides may be employed by individual code frames, such that different code frames within the same code assembly may have different overrides and specified permissions for the overrides.

To increase performance, a stack walk may be avoided by caching an intersection of permission grant objects of all code assemblies in the application, and then comparing a requested permission to this intersection. Any permission present in the intersection is, by construction, a member of every loaded assembly's permission grant set. As such, if the requested permission is a subset of the cached intersection set, and if the call stack does not contain any stack overrides, then the requested permission is guaranteed to be satisfied by every frame above the called code frame. The called code frame may then proceed to perform the protected operation.

FIG. 1 depicts an evidence-based security policy manager 104 in an embodiment of the present invention. A resource location 100, such as a Web server, is accessible by a computer system 102 (e.g., a Web client or server) across a network (not shown). A resource location is commonly indicated by a URI (Uniform Resource Identifier), which is a generic term for all types of names and addresses that refer to objects on the World Wide Web. A URL (Uniform Resource Locator) is a kind of URI. Exemplary resources may include without limitation documents, images, audio data, applications, routines, and other data and code datastores accessible through a network. It should be understood that a resource location may be local to the computer system 102 or remote to the computer system 102 (e.g., coupled by the Internet).

One type of resource relevant to an embodiment of the present invention is a code assembly. A code assembly may, for example, consist of applet code, application code, class code, routine code, and data. Code and data included in a code assembly may be in the form of byte-codes, intermediate code, machine code, and data components (classes, images, audio and video clips, etc.). Furthermore, a code assembly may be packaged in an archive file containing one or more classes downloaded from a resource location. In one embodiment of the present invention, classes of an application are combined into a module (an output of a linking process), and one or more modules may be combined into a code assembly.

FIG. 1 is described relative to a downloaded application executing on a computer system 102. Alternative embodiments may include downloaded applets, ACTIVEX controls, and other routines and objects. The exemplary downloaded application consists of objects defined in one or more local or remote code assemblies. Local code assemblies are stored within the computer system 102 and are loaded into memory when needed. Remote code assemblies are downloaded from a resource location, such as resource location 100.

The computer system 102 initiates a run-time environment to execute the downloaded application and to manage security of the computer system 102. The run-time environment on the computer system 102 may be initialized by a "trusted host", such as an operating system shell, a browser, an SQL server, or other code that is external to the run-time environment. The host, the loader 113, or some other shared resource initiates execution of the application by downloading the various code assemblies 106 that constitute the application to the computer system 102 and passing the code assemblies 106 to a virtual machine 10 for execution.

A virtual machine provides a self-contained operating environment that performs much of the functionality of a separate computer. For example, an application can run in a virtual machine without direct access to the host operating system. This design has at least two advantages:

System Independence: An application will run the same in any virtual machine that supports the programming language in which the application is written (through a conversion process, if necessary), regardless of the hardware and software underlying the system. For example, the same application (i.e., the same programming code) can run in a virtual machine on different computer systems having different types of microprocessors and different types of operating systems.

Security: Applications running in a virtual machine are generally prevented from accessing protected system resources (i.e., the operating system, the file system, protected regions of memory, a connected network or peripheral). It should be understood, however, that an embodiment of the present invention can evaluate evidence and a security policy to determine whether to permit an application to access protected system resources. If permission for a given operation is granted, the application is considered "trusted" for that operation.

As the application components (e.g., downloaded code assemblies 106) are received by the computer system 102, a verification module 112 ensures that downloaded code in the code assemblies 106 is properly formatted and does not violate the safety restrictions of the code language or the virtual machine 110. Specifically, the safety restrictions that are to be enforced prevent potentially malicious code from accessing data other than through the well-defined interfaces of the code. It is important that verified code be unable to examine or modify the granted permission sets that are associated with the code assembly through mechanisms that are inaccessible to the code assembly (i.e., accessible only to the execution environment). Other verifications, such as verifying that pointer addressing is not present, that internal stacks cannot overflow or underflow, and that code instructions will have the correct typed parameters, may also be performed. The code assemblies are then passed to a class loader 113, which can ensure that the application does not replace system-level components within the run-time environment (e.g., the class loader can force host-provided code assemblies to be executed when requested, thereby superceding name conflicts with downloaded code assemblies). Thereafter, the class loader 113 loads the code assemblies 106 onto a run-time call stack 114 in response to requests from the virtual machine 110.

Figure 2A:
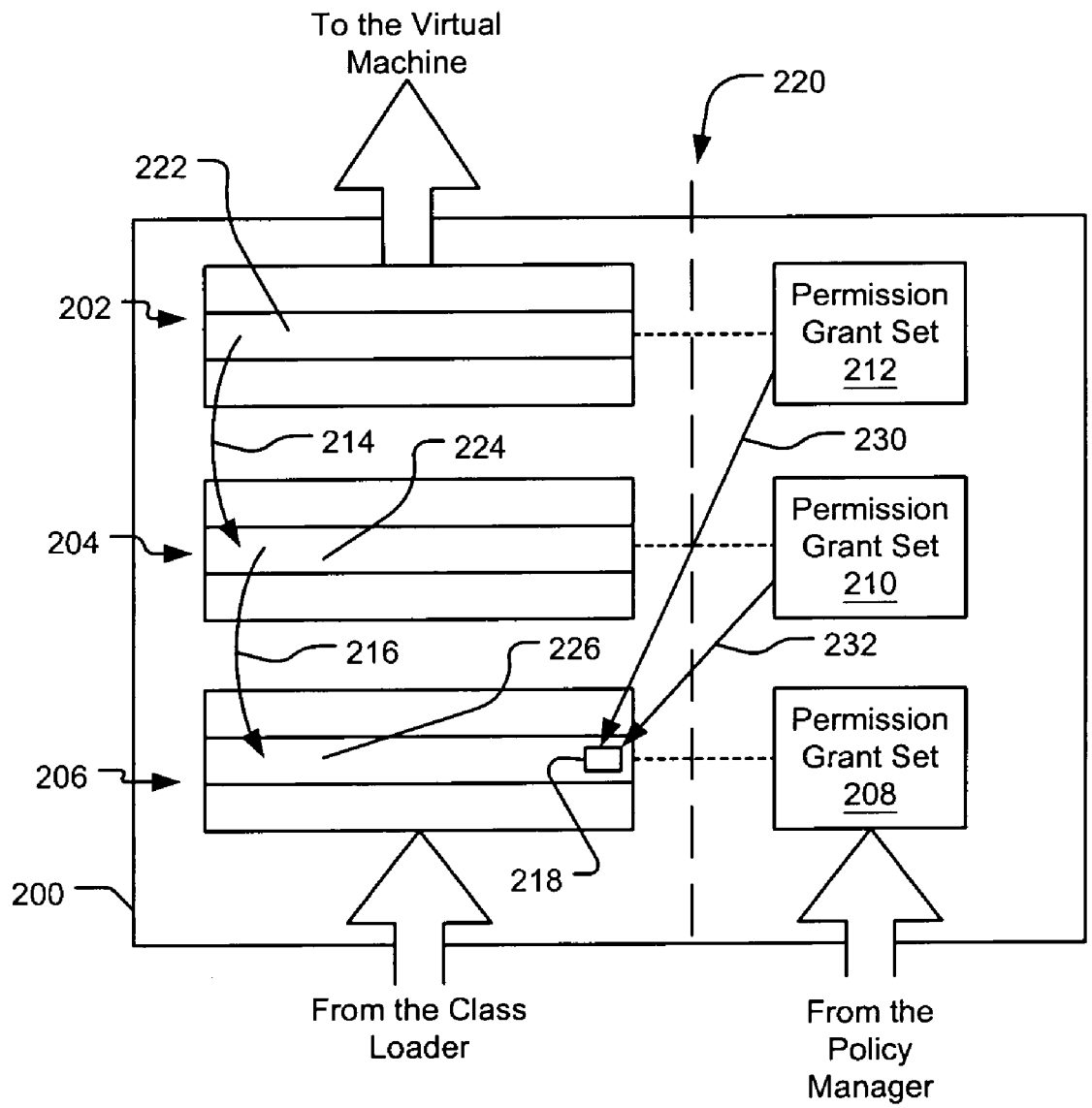
FIG. 2A represents a run-time call stack in an embodiment of the present invention.

For example, the virtual machine executes a routine contained within a first code assembly (e.g., main code assembly 202 of FIG. 2A) that calls a routine provided by a second code assembly (e.g., parser code assembly 204 of FIG. 2A). The class loader 113 receives the virtual machine's request for the second code assembly and loads the second code assembly into the run-time call stack 114 so that the first code assembly can call the needed routine.

In order to ensure that unauthorized accesses to protected areas are prevented, evidence 108 associated with each of the downloaded code assemblies 106 may input to the policy manager 104. The policy manager 104 determines the permission grant set associated with each code assembly. A security policy specification 116 is also input to the policy manager 104 to assist in the computation of appropriate grants. Based on these inputs, the policy manager 104 computes the appropriate grants for each code assembly and passes a resulting permission grant set to the run-time call stack 114.

As such, each code assembly in the run-time call stack 114 is associated with a corresponding permission grant set (e.g., permission grant sets 208, 210, and 212 in FIG. 2A). A permission grant set is received from the policy manager and defines various permissions that have been computed for a corresponding code assembly. The permissions associated with each code assembly may vary widely based on the relative origin of the code assembly (e.g., local or remote), the specific origin of the code assembly (e.g., a specific URL), date, time of day, or other trust characteristics of the code assembly, all of which may be referred to as "evidence" 108. Exemplary trust characteristics may include cryptographic strong names, AUTHENTICODE signatures, and other security related evidence. In an embodiment of the present invention, evidence is used to determine a permission grant set for a given code assembly. Furthermore, a security policy specification 116 may define multiple policy levels within a security framework for a given enterprise, machine, user, application, etc. in which the evidence of a given code assembly is evaluated.

In an embodiment of the present invention, each permission grant set is represented by a permission grant object, which may be created by the policy manager in response the receipt of the code assembly by the computer system 102 of FIG. 1 and associated evidence. The permission grant class is a subclass of a class called "CodeAccessPermission" and complies with an IPermission interface. For example, if the policy manager grants a code assembly with "read" access to the entire "C:" drive, a permission grant object may be created with a call such as:

FP=new FileIOPermission("c:\", "read");

where FileIOPermission is a subclass of CodeAccessPermission.

In an embodiment of the present invention, each permission class (e.g., which defines a permission request object or a permission grant object) is derived from a CodeAccessPermission class. Exemplary methods of a CodeAccessPermission class are listed below and are described throughout this disclosure.

```
class CodeAccessPermission ( )
{
    Void Demand ( );
    Void DemandImmediate ( );
    Void CheckDemand (CodeAccessPermission demand);
    IPermission Intersect (IPermission target);
    IPermission Union (IPermission other);
    IPermission Copy ( );
    Boolean IsSubsetOf (IPermission target);
    Void Assert ( );
    Void PermitOnly ( );
    Void Deny ( );
}
```

Other permission grant objects may also be granted to the code assembly and included in the permission grant set. During runtime, the permission grant objects in the permission grant set are checked to determine whether a code frame in a given code assembly may perform a protected operation.

FIG. 2A represents a run-time call stack 200 containing individual exemplary code assemblies that are stacked in the order in which they were called. Each code assembly 202, 204, and 206 is depicted with one or more code frames, each code frame representing a method within the code assembly. It should be understood that a code assembly may contain an arbitrary number of code frames, depending on the functionality and structure of the given code assembly.

The individual code assemblies may be downloaded from a remote resource location or may be retrieved locally from the computer system 102 of FIG. 1 or a network-attached or bus-attached peripheral (not shown). The individual code assemblies are loaded into the run-time call stack 114 by the class loader 113 for access and execution by the virtual machine 110 in FIG. 1.

A permission grant set can be associated with a code assembly, a module of a code assembly, a class of a code assembly, or a method of a call assembly in the call chain. In one embodiment, one or more pointers or references are associated with the code assembly, module, class or method to indicate which permission grant set is associated with which code assembly, module, class, or method. Evidence may also be associated with a code assembly, a module of a code assembly, a class of a code assembly, or a method of a call assembly. In one embodiment, methods of a single code assembly are associated with the same permission grant set. As such, the permission grant set need only be checked for the immediate caller and call chain transitions between methods in different preceding assemblies (i.e., calls made between two methods within the same code assembly may not require a permission grant set check). In an alternative embodiment, each method, class, or module may be associated with its own permission grant set.

In the example of FIG. 2A, an object of the main application class in code assembly 202 is loaded first by the class loader into the illustrated run-time call stack 200. As the virtual machine executes the main class in code frame 222, the main class calls (as shown by arrow 214) a method in code frame 224 of the code assembly 204 to parse a data file in a protected area of the computer system. Accordingly, the class loader loads the parser code of the code assembly 204 into the run-time call stack 200. Thereafter, the parser method eventually calls (as shown by arrow 215) a method in code frame 225. The method in code frame 225 calls a file access method in a code frame 226 of the code assembly 206, as shown by arrow 216, to perform a read operation on the protected file. Accordingly, the class loader loads the file access code of the code assembly 206 into the run-time call stack 200. In this scenario, a permission grant set corresponding to each code assembly in the call stack may be evaluated (in a "demand" call) prior to each protected call to a lower level code assembly to verify that the calling code frame has permission to execute the called code frame.

An objective of associating a specific permission grant set with a given code assembly is to assist the system in determining whether the given code assembly has the appropriate permission to perform a protected operation. In some circumstances, however, determining whether the given code assembly has the appropriate permission is not enough. "Luring attacks" represent an inherent security problem with partially trusted mobile code (e.g., a downloaded code assembly) interacting with a more or less trusted code assembly within the system. The basic attack for a less trusted code assembly is to call a more trusted code assembly and to get the more trusted code assembly to access a protected resource on behalf of the less trusted code assembly. Accordingly, one defense against luring attacks is to verify a code frame's runtime permission requests against the permission grants associated with code assemblies of preceding code frames in the runtime call stack (absent stack walk overrides). As such, a code frame's attempt to access a protected resource in an embodiment of the present invention is evaluated against the permission grant sets of preceding code assemblies in the run-time call stack 200.

In one embodiment of the present invention, the evaluation operation may be initiated from inline code in the called method. For example, assume that a method foo( ) in code assembly 206 is called by a method in code assembly 204 (see arrow 216 representing a method call across a code assembly boundary). The method foo( ) is programmed to perform a file access to a protected resource. Accordingly, in this embodiment, the developer of the method foo( ) incorporates code that specifies a requested operation required to perform the protected operation and creates a runtime permission request object 218 (see the pseudo code example below).

```
1    foo ( )
2    {
3            FP = new FileIOPermission
             ("c:\protectedDir\protectedFile", "read");
4            FP.Demand ( );
5            <Instructions for reading the file "protectedFile">
6    }
```

In line 3 of the pseudo code example, a runtime permission request object 218 ("FP") is instantiated during the execution of the code assembly 206. The instantiation call specifies a specific file, "c:\protectedDir\protectedFile", and a desired permission type, "read", which constitute an example of a requested permission. It should be understood that a requested permission may include one or more permissions, allowing the code frame to demand that the permissions it requires to perform a given protected operation be checked in bulk or in parallel with a single demand. In line 4 of the pseudo code example, a demand is made to the runtime permission request object 218, which determines whether the requested permission is available in the call chain to the code frame 226.

In this scenario, the permission request object 218 determines whether the code assembly associated with the calling code frame 225 and all previous code frames 224, 222 and any other preceding code frames in the runtime call stack have the requested permission. If so, the file access instructions on line 5 may be executed. However, if the demand fails, a security exception is thrown and the instructions on line 5 are not executed. It should be understood that, in the illustrated embodiment, each code assembly creates one or more runtime permission request objects to check available permissions. In response to a demand, each runtime permission request object verifies that the requested permission is provided in the permission grant sets of the preceding code assemblies (as shown by arrows 230 and 232).

In an alternative embodiment of the present invention, permission demands may be specified by a declaration in the code assembly source code. The declaration may be processed by a Just-In-Time (JIT) compiler to insert the appropriate source code indicated by the declaration. For example, the exemplary declaration and pseudo code below can result in the same functionality after compilation as the pseudo code of the example above.

```
1    [FileIOPermission(SecurityAction.Demand,
     "c:\protectedDir\protectedFile",
2                         "read")]
3    foo ( )
4    {
5            <Instructions for reading the file "protectedFile">
6    }
```

When compiled, the declaration above causes the JIT compiler to insert the code for instantiating the FileIOPermission and demanding the permission into the executable code output from the compiler.

Other declarations may be employed for non-runtime permission checks. For example, the declaration

[FileIOPermission(SecurityAction.LinkDemand,
                    "c:\protectedDir\protectedFile", "read")]

causes the loader to verify that the code assembly that is attempting to link to the class or method has the file permission indicated. For example, suppose assembly A1 has a class C1 with method M1, and M1 has the above declaration applied to it. If assembly A2 includes a call to M1 (of C1 in A1), then the loader will only resolve the reference to M1 if A2 has file permission to read c:\protectedDir\protectedFile. Failure to satisfy this condition may result in an exception.

In an alternative example, the declaration

[(FileIOPermission(SecurityAction.InheritDemand,
                    "c:\protectedDir\protectedFile", "read")]

causes the loader to verify that the assembly that is attempting to subclass the class or override a method has the file permission indicated. For example, suppose assembly A1 has a class C1 with method M1, and C1 has the above declaration applied to it. Then if assembly A2 defines a subclass of C1, it will only be allowed if A2 has file permission to read c:\protectedDir\protectedFile. Alternatively, if the declaration was on M1 rather than C1, then A2 could freely subclass C1 but would only be allowed to override method M1 if A2 has file permission to read c:\protectedDir\protectedFile.

In an embodiment of the present invention, the demand operation is performed in association with a permission grant object created by the policy manager and loaded into the runtime stack. Both the runtime permission request object and the permission grant object expose a common interface, called "IPermission". An exemplary IPermission interface is listed below, however, it should be understood that methods and calling parameters of the common interface may be varied within the scope of the present invention.

```
1   public interface IPermission:ISecurityEncodable
2   {
3       // Returns a copy of the permission object
4       Permission Copy( );
5       // Computes a permission that is the intersection of the
        permission object
6       // and the target parameter permission object.
7       IPermission Intersect (IPermission target);
8       // Computes a permission that is the union of the
        permission object
9       // and the target parameter permission object.
10      IPermission Union (IPermission target);
11      // Test if the current permission object is a subset of the target
        parameter
        // permission object
11      IPermission IsSubsetOf (IPermission target);
12      // Demands at run-time that all callers in the call chain have
        the target
13      // parameter permission object, subject to overrides
14      void Demand( );
15      // Demands at run-time that the immediate caller in the call
        chain has the
16      // target parameter permission object, subject to overrides
17      void DemandImmediate( );
18  }
```

A "copy" of a permission object exposes the IPermission interface and represents the same access to resources that the original permission object does.

Generally, an "intersection" operation (represented by the symbol "∩") is a set operation that yields the common elements of the operand sets. For example, if Set1 includes elements A, B, and C, and Set2 includes elements B, C, and D, then the intersection of Set1 and Set2 (i.e., Set1∩Set2) equals B and C. Accordingly, the intersect( ) method returns the minimum set of permissions for which a demand that passes both permissions objects will also pass their intersection. The intersect( ) method provides a means to retrieve shared state between two permissions. If there is no shared state (i.e., permission) between the two instances, then the method returns "null". Otherwise, the method returns a new permission object with the permission-defined intersection of the original permission object and the target permission object.

In contrast, "union" operation (represented by the symbol "U") is a set operation that yields all elements in the operand sets (i.e., the non-duplicative aggregation of all the elements in the sets). For example, if Set1 includes elements A, B, and C, and Set2 includes elements B, C, and D, then the union of Set1 and Set2 (i.e., Set1∩Set2) equals A, B, C and D. Accordingly, the union( ) method returns the set of permissions that pass at least one of the original permission object and the target parameter permission object. The union( ) method provides a means to combine to states (i.e., permission) contained with two permission objects.

The IsSubsetOf( ) method defines a standard mechanism for determining containment relationships between two permission objects of the same type. In an embodiment of the present invention, subset relationships are use to determine whether a demand for a permission is satisfied by a grant of another permission of the same type. For example, demand X is satisfied by grant Y if X.IsSubsetOf(Y) returns TRUE. It is understood that "X.IsSubsetOf(Y) returns TRUE" implies that the permission demand represented by X is no greater than the grant represented by Y. However, if X is a subset of Y and X is satisfied by the current security context, these conditions do not imply that a demand for Y will also be satisfied. The IsSubsetOf( ) method is commonly used to determine whether a requested permission has been granted to a demanding code assembly. Moreover, the IsSubsetOf( ) method of a permission object in a preceding permission grant set is commonly used by a permission object in a subsequent permission grant set to determine whether a permission grant is available up the call chain.

In an embodiment of the present invention, the Intersect( ), Union( ), IsSubsetOf( ) operations are particular to the semantics of a given type of permission object. As such, the results of the Intersect( ), Union( ), and IsSubsetOf( ) operations are only defined if both the original permission object and the target parameter are the same type of permission object (e.g., FileIOPermission). In an alternative embodiment, a common semantic may be defined such that permission objects of disparate types may interact with Intersect( ), Union( ), and IsSubsetOf( ) type operations.

Although the preceding discussion has identified common operational definitions of the IPermission methods, methods in customized permissions may be developed to alter the standard definitions of the logical set operations and functionality. For example, a customized permission, called CustomFileIOPermission, may be subclassed from FileIOPermission or from CodeAccessPermission so as to evaluate a rating value or other system-provided information against a threshold within the permission grant object, relative to a requested permission. That is, the decision as to whether the grant satisfies the demand may depend in part on information external to the demand object. For example, a limited use license may be enforced through such a customized permission scheme, in which the threshold value in the grant is the license termination date. When evaluating whether a demand is satisfied by this grant, the grant will look at the current date as well as the particular permission request object.

Within the code assembly, a given permission request object represents a permission that the code assembly requests to perform a particular operation. The Demand( ) method provides the means to invoke the request for the specified permission for the current permission grant set and the preceding permission grant sets in the call chain. For each type of permission request object, the mechanism to verify the demand may be different. The Demand( ) method is typically used by the secure libraries to ensure that callers have a particular permission. For example, a File class in a secure library may demand a necessary FileIOPermission before performing a file operation requested by the caller. The DemandImmediate( ) method provides the means to invoke the request for a specified permission from the immediately preceding grant set.

As shown in FIG. 2A, each code assembly performs a demand indirectly through a security layer 220. In an embodiment of the present invention, when a permission request object of a given type makes a demand, the Check- Demand( ) method of each preceding permission grant object of the same type in the run-time call stack is called. The CheckDemand( ) method receives an input parameter that is the permission grant object (or a copy thereof) associated with the corresponding permission code assembly. In one embodiment, application code in the current code assembly cannot call the CheckDemand( ) method directly, but only through the Demand( ) method of the IPermission interface. Alternatively, the CheckDemand( ) method may be called directly by the application code.

Figure 2B:
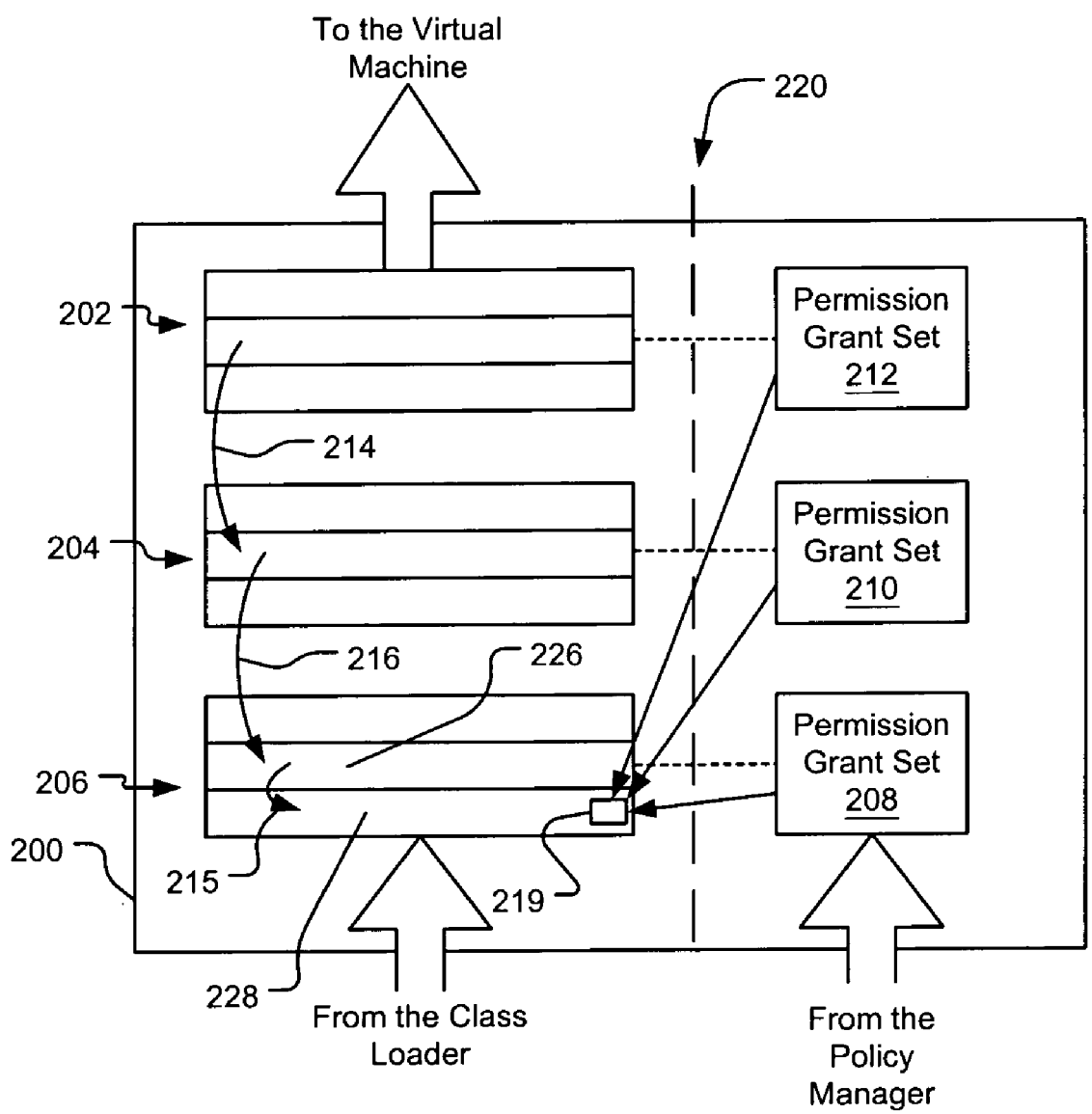
FIG. 2B represents a run-time call stack with an additional call in an embodiment of the present invention.

FIG. 2B represents a run-time call stack with an additional call in an embodiment of the present invention. FIG. 2B shows the code frame 226 calling code in a code frame 227, which then calls code in a code frame 228. The code frame 228 specifies a requested permission required to perform a protected operation and creates a permission request object 219. As discussed with regard to FIG. 2A, the permission request object 219 determines whether one or more permissions requested by the called code frame 227 to perform the protected operation are satisfied by verifying that the calling code frame and all preceding code frames have the requested permission (absent stack overrides) in a stack walk operation. Because the called code frame 228 is called by the calling code frame 227 in the code assembly 206, the permission request object 219 determines whether a permission grant object of permission grant set 208 includes the requested permission.

Thereafter, because code frames 224 and 225 are in the call chain of code frame 228, a permission grant object of permission grant set 210, which is associated with the preceding code assembly 204 in the runtime call stack, is checked to determine whether it includes the requested permission. Likewise, because code frame 222 is in the call chain of code frame 228, a permission grant object of permission grant 212, which is associated with the preceding code assembly 202 in the runtime call stack, is also checked to determine whether it includes the requested permission. If the stack walk operation indicates that the permission grant objects associated with the code assemblies in the call chain have the requested permission, execution of the called code frame is then permitted. Otherwise, execution of the called code frame is inhibited, although execution of the same code frame or an associated code frame having alternative functionality might be accomplished by way of another requested permission.

Figure 3:
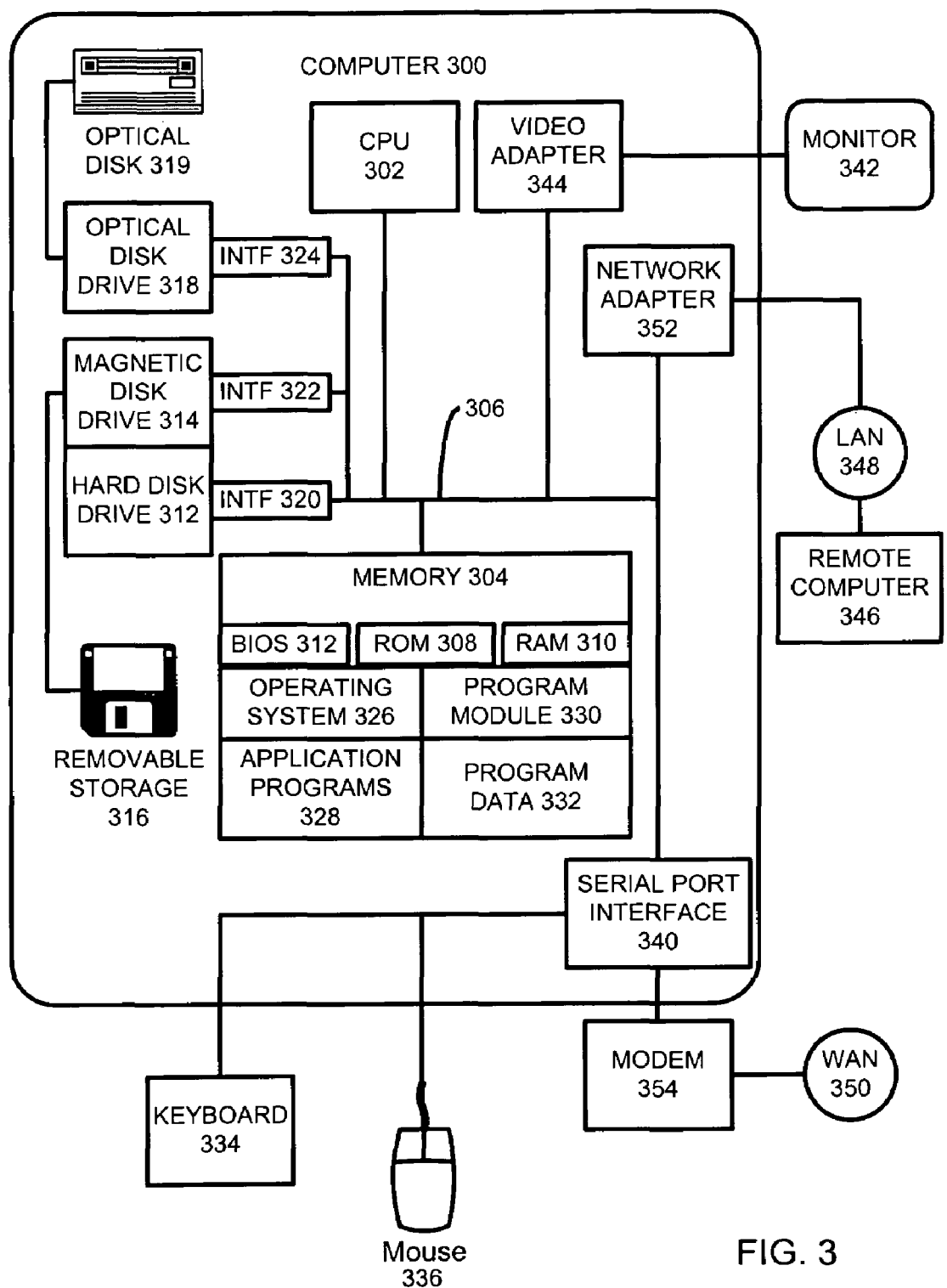
FIG. 3 illustrates an exemplary system useful for implementing an embodiment of the present invention.

FIG. 3 illustrates an exemplary system useful for implementing an embodiment of the present invention. An exemplary computing system for embodiments of the invention includes a general purpose computing device in the form of a conventional computer system 300, including a processor unit 302, a system memory 304, and a system bus 306 that couples various system components including the system memory 304 to the processor unit 300. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 312 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 312, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communication link between the computers may be used.

In the illustrated embodiment, a security policy specification may be read from a file on the hard disk drive 312, for example, into memory 304. The CPU 302 executes memory-resident instruction code for a computer processes that implement a virtual machine and that process a permission demand from a code assembly received from a resource location relative to one or more permission grant sets. Furthermore, the CPU 302 executes the software components that implement the runtime security context recited in the claims.

Figure 4A:
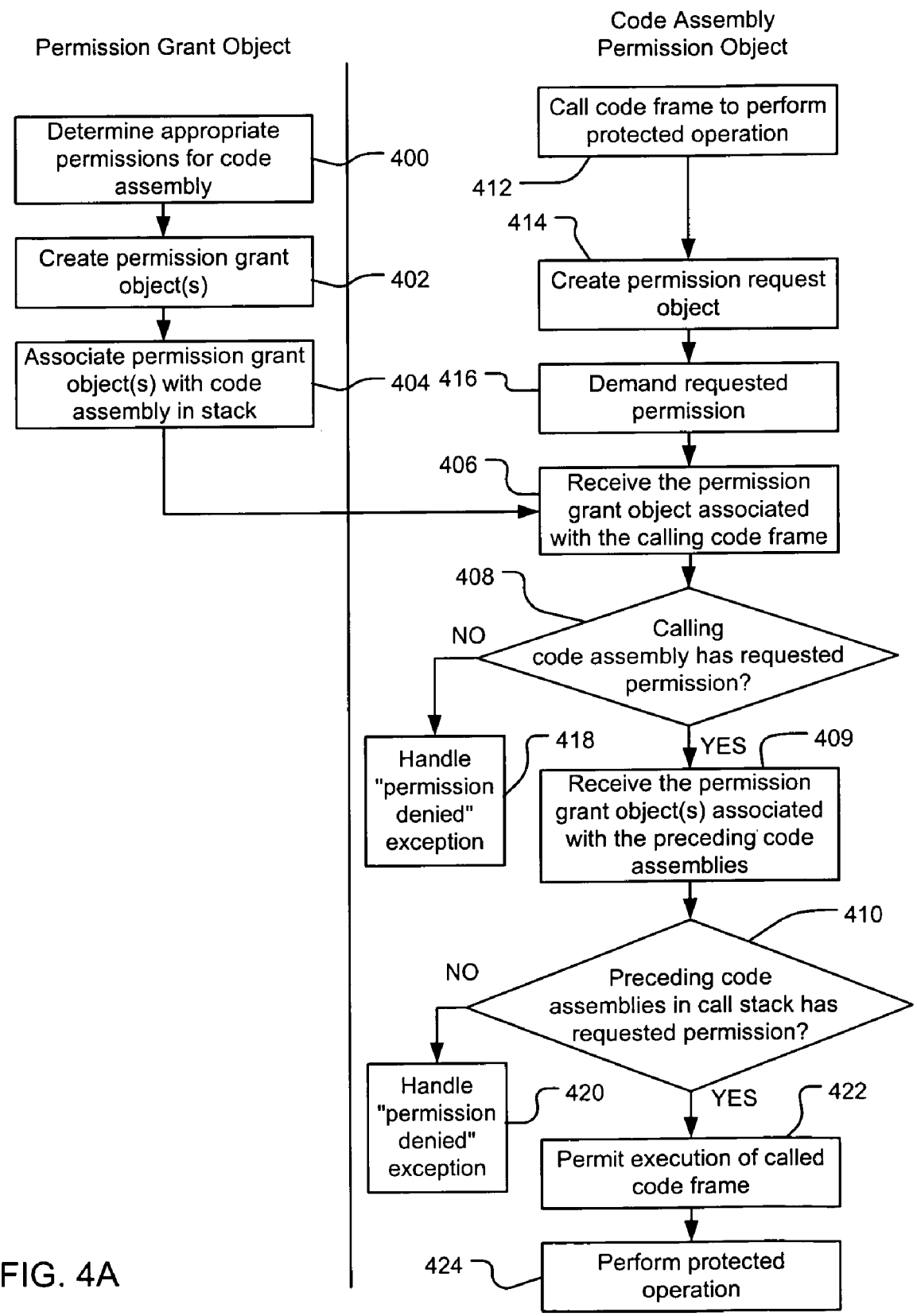
FIG. 4A illustrates a flow diagram of operations for determining whether a called code frame in a runtime call stack has a requested permission to perform a protected operation in an embodiment of the present invention.
Figure 4B:
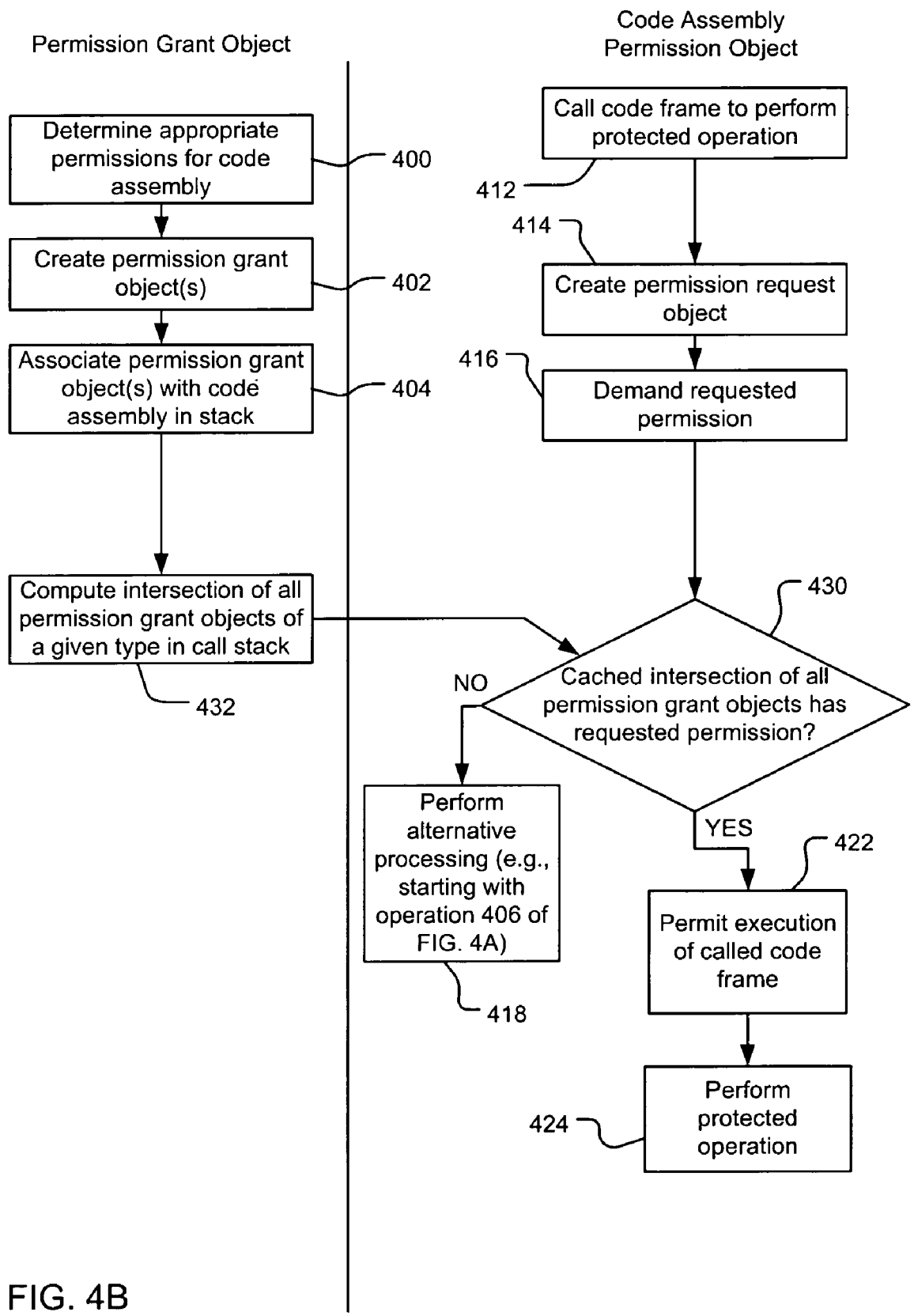
FIG. 4B illustrates a flow diagram of operations for determining whether a called code frame in a runtime call stack has a requested permission to perform a protected operation in an alternative embodiment of the present invention.

FIGS. 4A and 4B illustrate a flow diagrams of operations for determining whether a called code frame in a runtime call stack has a requested permission to perform a protected operation in embodiments of the present invention. Operations relating to a permission grant object are illustrated on the left side of FIGS. 4A and 4B. Operations relating to the call chain, a code frame, and a permission request object are illustrated on the right side of FIGS. 4A and 4B. A calling operation 412 calls a given code frame. This operation occurs during runtime and may result in the retrieval of an appropriate as-yet-non-loaded code assembly containing the appropriate code frame. Alternatively, the code assembly may already be loaded into the runtime call stack by virtue of a previous call in the call chain.

Operations 400–404 may be performed at load time (i.e., in response to a call to a code frame in a non-loaded code assembly). That is, typically, the operations 400–404 do not involve execution of any code within the code assembly itself. If the code assembly is already loaded by virtue of a previous call to the code assembly in the call chain, operations 400–404 may be omitted.

A permission determination operation 400 is performed (e.g., by a policy manager 104 of FIG. 1) to generate a permission grant set in accordance with a security policy specification and, optionally, evidence received in association with a received code assembly. A creation operation 402 creates one or more permission grant objects in accordance with the permission grant set. It also should be understood some code assemblies, methods, modules, or classes may be granted zero permissions by the policy manager, resulting in a permission grant set containing zero permission grant objects and granting zero permissions. An association operation 404 associates each permission grant object with the corresponding code assembly in the runtime call stack. Once the code assembly and the permission grant set are loaded into the runtime call stack initiation of the called code frame may continue.

Once the code assembly and associated permission grant set, including associated permission grant objects, are loaded, the creation operation 414 creates a permission request object. It should be understood that a permission request object need only be created when a called code frame includes instructions to perform a protected operation. Otherwise, the called code frame may be executed without the permission checks discussed herein. Assuming that the calling operation 412 involves the performance of a protected operation, the permission request object is created in operation 414. A demanding operation 416 issues a demand from the called code frame for a requested permission (e.g., "c:\protectedDir\protectedFile", "read"), which is specified by the called code frame for the purpose of verifying permission to perform the protected operation.

A receiving operation 406 receives the permission grant object of the same type as the permission request object. A decision operation 408 determines whether the requested permission is a subset of the granted permission of the calling code assembly. The calling code assembly may be the same code assembly as the code assembly containing the called code frame, or it may be a preceding code assembly.

In one embodiment of the present invention, a method, called "CheckDemand", of the permission request object is called with a copy of the permission grant object associated with the code assembly to determine whether the calling code assembly has the requested permission. The CheckDemand method determines whether the requested permission is available in the permission grant object. One method of performing this determination in the CheckDemand method is to call the IsSubsetOf( ) method in the IPermission interface of the permission request object with the permission grant object as an input parameter. In a customized permission scheme, with a customized permission request object and a customized permission grant object, alternative methods of determining whether a requested permission is available may be employed (e.g., limiting specified permissions to a given time period in the day, to a given date, etc.).

If the calling code assembly does not have the requested permission, then a security exception is thrown indicating that a requested permission was denied. An error operation 418 catches and handles the security exception, such as by preventing or inhibiting execution of the called code frame, requesting an alternative permission for the called code frame, or calling an alternative code frame requiring an alternative permission, if any. The exception may be caught by any code frame up the call stack. If no code frame provides code for catching the exception, then execution may be terminated.

If the calling code assembly does have the requested permission, then a receiving operation 409 receives the permission grant object associated with the next preceding code assembly in the call chain. A decision operation 410 determines whether the next preceding code assembly in the call stack has the requested permission. If not, error operation handles the resulting security exception. Otherwise, operations 409 and 410 may be repeated (absent overrides) until all code assemblies present on the call stack are verified as having the requested code assembly. If no additional preceding code assemblies exist in the runtime call stack and all executions of decision operation 410 are positive, permission operation 422 permits execution of the called code frame. Protected operation 424 is then performed.

In an alternative embodiment of the present invention, the flow illustrated in FIG. 4A may be modified to involve a cached permission set including the intersection of the permission grant sets from all code assemblies in the application, as shown in FIG. 4B. As permission grant objects are loaded into the runtime call stack in accordance with operation 400–404, the intersection of the permissions provided by those permission grant objects is computed in computing operation 432 and recorded in a storage location (e.g., a memory location). A decision operation 430 determines whether the requested permission is included in the intersection of the permissions, bypassing the stack walk operation described with regard to FIG. 4A. If the check against the cached permission set fails in decision operation 430, then processing of the stack walk may proceed as in FIG. 4A, starting at receiving operation 406.

Figure 5:
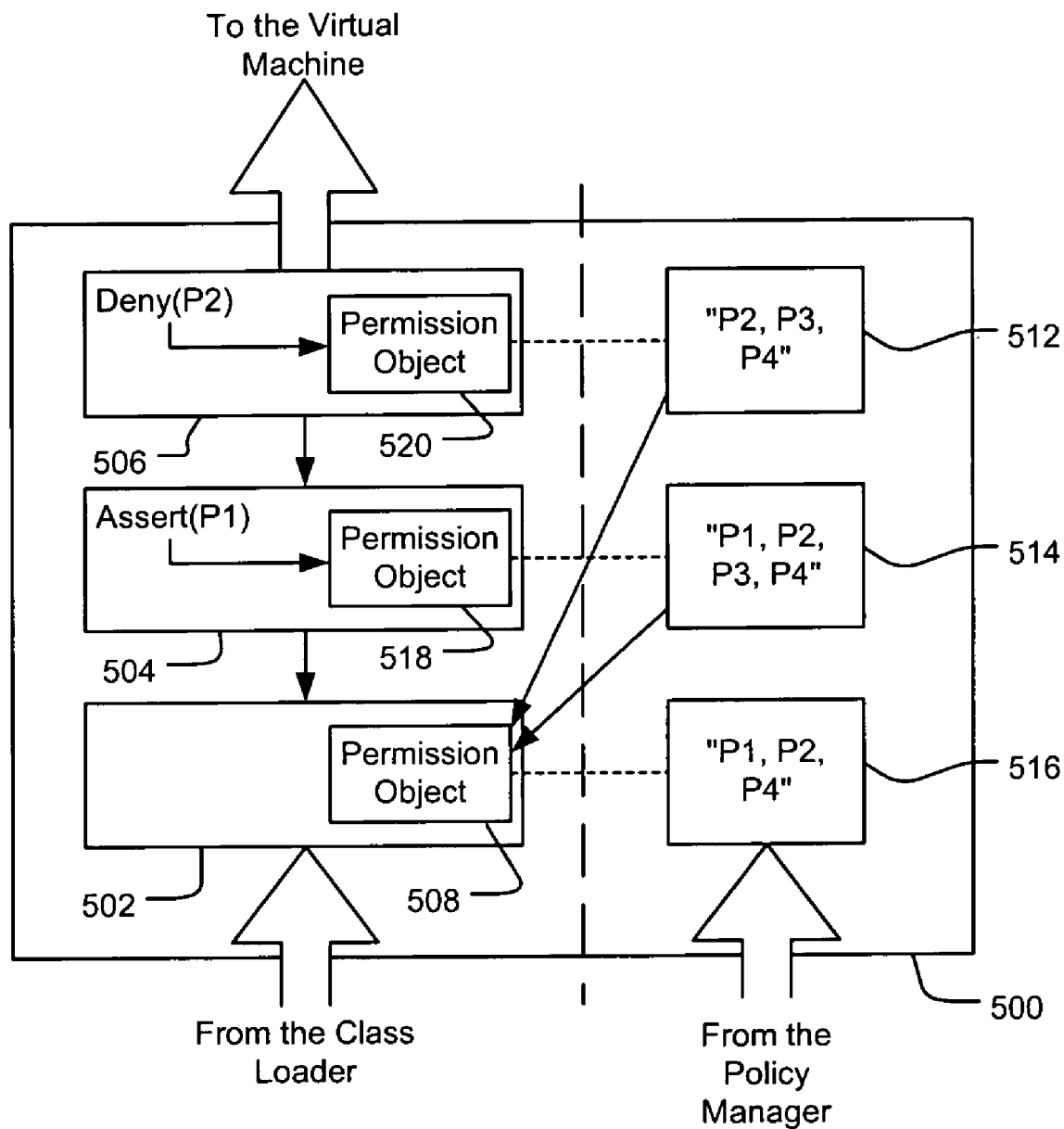
FIG. 5 illustrates an exemplary runtime call stack walk including dynamic overrides of permission provided for a called code frame in an embodiment of the present invention.

FIG. 5 illustrates an exemplary runtime call stack walk including dynamic overrides of permissions provided for a called code frame in an embodiment of the present invention. A stack walk demand of permissions of all callers in a run-time call stack starts with the lower code frames and works up to the top of the stack. A higher-level code frame (e.g., code assembly 504) is said to "precede" a lower level code frame (e.g., code assembly 502) in the runtime call stack. For example, a higher-level code frame may call a lower level code frame. A lower level code frame is said to "follow" a higher-level code frame within the runtime call stack. In various embodiments of the present invention, code frames may be embodied by code assemblies, modules, methods, classes, and other known code sets. Absent overrides, the stack walk demand succeeds if the current code frame and all code frames above the point of demand on the stack have the requested permission.

To allow certain trusted code to perform operations beyond the permissions of some of its callers, a set of overrides to the stack walk are provided in an embodiment of the present invention. Overrides are defined for a given permission or set of the permissions and may have the effect of stopping the stack walk in the case of a demand of those permissions.

FIG. 5 illustrates a runtime call stack 500 including a code assembly 506, which is associated with a permission grant set 512. The permission grant set 512, which may have been generated by the policy manager 104 of FIG. 1, includes permissions "P2", "P3", and "P4" stored and managed by one or more permission grant objects. For ease of description, it is assumed that each code assembly in FIG. 5 includes a single code frame. However, it should be understood that each code assembly can include an arbitrary number of code frames, depending on the functionality and structure of the given code assembly.

The code frame within the code assembly 506 calls the code frame within a code assembly 504, which is associated with a permission grant set 514. The permission grant set 514 includes permissions "P1", "P2", "P3", and "P4". Likewise, the code frame within the code assembly 504 calls a code frame within a code assembly 502, which is associated with a permission grant set 516. The permission grant set 516 includes permissions "P1", "P2", and "P4".

In the illustrated embodiment, if the code frame in code assembly 502 (also referred to as the code frame 502) requests permission P4 to perform a protected operation, the permission request object 508 will walk the stack, starting with the permission grant objects associated with the code assembly 504, which contains the calling code frame (also referred to as code frame 504), to determine if the requested permission is available up the call chain. As shown by the exemplary permissions illustrated in FIG. 5, both the permission grant object 512 and the permission grant object 514 include the permission P4. Therefore, the called code frame 502 may be executed to perform the protected operation.

In the illustrated embodiment, if the code frame 502 requests permission P3 to perform a protected operation, the permission request object 508 will walk the stack, starting with the permission grant objects associated with the code assembly 504, to determine if the requested permission is available up the call chain. As shown by the exemplary permissions illustrated in FIG. 5, both the permission grant object 512 and the permission grant object 514 include the permission P3, although the permission grant object 516 does not. Nevertheless, the called code frame 502 may be executed to perform the protected operation.

In the illustrated embodiment, if the code frame 502 requests permission P2 to perform a protected operation, the permission request object 508 will walk the stack, starting with the permission grant objects associated with the code assembly 504, to determine if the requested permission is available up the call chain. As shown by the exemplary permissions illustrated in FIG. 5, both the permission grant object 512 and the permission grant object 514 include the permission P2. However, the code frame associated with the code assembly 506 (also referred to as the code frame 506) has executed a "Deny" override with respect to permission P2 in the illustrated call chain.

The Deny override is called by a given code assembly within an associated permission request object 520 before the code assembly calls to a lower level code assembly. The Deny override causes the permission grant set to dynamically decline a lower level code assembly's demand for a specified permission (e.g., "P2") within the call chain, regardless of whether the specified permission was originally granted in the permission grant set. In the illustrated example, therefore, although the permission grant object 512 provides permission P2, the Deny override declines the demand by the permission request object 508. As such, the called code frame 502 is prevented from performing the protected operation because requested permission P2 was not satisfied up through the entire call chain.

In the illustrated embodiment, if the code frame 502 requests permission P1 to perform a protected operation, the permission request object 508 will walk the stack, starting with the permission grant objects associated with the code assembly 504, to determine if the requested permission is available up the call chain. As shown by the exemplary permissions illustrated in FIG. 5, the permission grant object 514 includes the permission P1, but the permission grant object 512 does not. Nevertheless, the code frame 504 has executed an "Assert" override with respect to permission P1 in the illustrated call chain.

The Assert override is called by a given code assembly within an associated permission request object 518 before the code assembly calls to a lower level code assembly. The Assert override causes the permission grant set to dynamically assert that the permission grant objects associated with preceding code assemblies in the runtime call stack also satisfy the specified permission the specified permission (e.g., "P1") within the call chain, regardless of whether the specified permission was originally granted in the permission grant set 512. In the illustrated example, therefore, although the permission grant object 512 does not provide the permission P1, the Assert override terminates the stack walk operation and satisfies the demand by the permission request object 508 for the requested permission P1. As such, the called code frame 502 is permitted to perform the protected operation because requested permission P1 was asserted to be satisfied up the remainder of the call chain.

Figure 6:
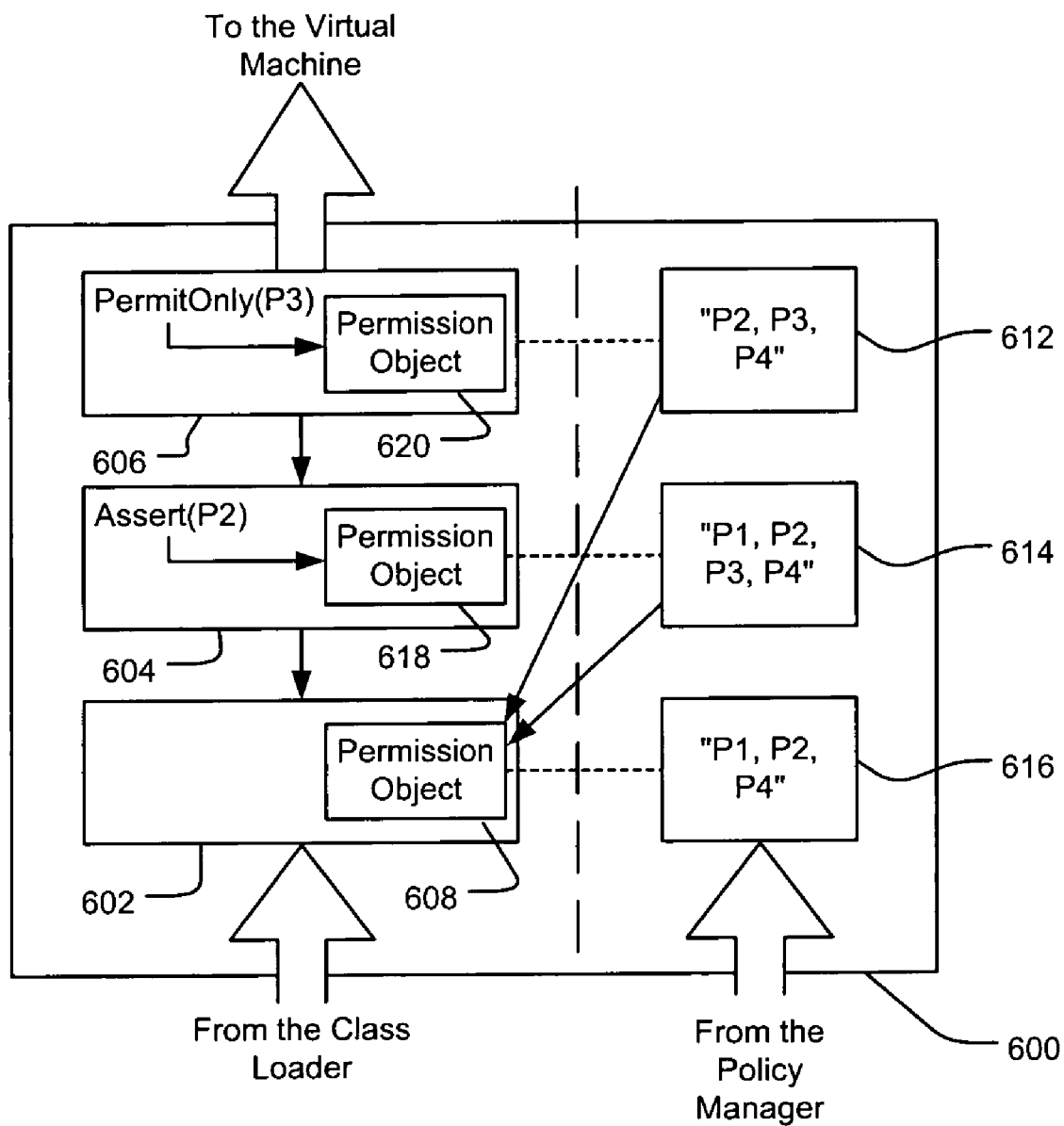
FIG. 6 illustrates an alternative exemplary runtime call stack walk including dynamic overrides of permission provided for a called code frame in an embodiment of the present invention.

FIG. 6 illustrates an alternative exemplary runtime call stack walk including dynamic overrides of permission provided for a called code frame in an embodiment of the present invention. The runtime call stack 600 includes a code assembly 606, which is associated with a permission grant set 612. The permission grant set 612, which may have been generated by the policy manager 104 of FIG. 1, includes permissions "P2", "P3", "P4" stored and managed by one or more permission grant objects. For ease of description, it is assumed that each code assembly in FIG. 6 includes a single code frame. However, it should be understood that each code assembly can include an arbitrary number of code frames, depending on the functionality and structure of the given code assembly.

The code frame within the code assembly 606 calls the code frame within a code assembly 604, which is associated with a permission grant set 614. The permission grant set 614 includes permissions "P1", "P2", "P3", and "P4". Likewise, the code frame within the code assembly 604 calls a code frame within a code assembly 602, which is associated with a permission grant set 616. The permission grant set 616 includes permissions "P1", "P2", and "P4".

In the illustrated embodiment, if the code frame 602 requests permission P4 to perform a protected operation, the permission request object 608 will walk the stack, starting with the permission grant objects associated with the code assembly 604, to determine if the requested permission P4 is available up the call chain. As shown by the exemplary permissions illustrated in FIG. 6, both the permission grant object 612 and the permission grant object 614 include the permission P4. However, the code frame associated with the code assembly 606 (also referred to as the code frame 606) has executed a "PermitOnly" override with respect permission P3 to the illustrated call chain.

The PermitOnly override is called by a given code assembly within an associated permission request object 620 before the code assembly calls to a lower level code assembly. The PermitOnly override causes the permission grant set to dynamically satisfy a demand for only the specified permission (e.g., P3) and to decline a lower level code assembly's demand for a requested permission (e.g., "P4") within the call chain, regardless of whether the requested permission was originally granted in the permission grant set. In the illustrated example, therefore, although the permission grant object 612 provides permission P4, the PermitOnly override declines the demand by the permission request object 608. As such, the called code frame 602 is prevented from performing the protected operation because requested permission P4 was not satisfied up through the entire call chain.

In the illustrated embodiment, if the code frame 602 requests permission P2 to perform a protected operation, the permission request object 608 will walk the stack, starting with the permission grant objects associated with the code assembly 604, to determine if the requested permission is available up the call chain. As shown by the exemplary permissions illustrated in FIG. 6, both the permission grant object 612 and the permission grant object 614 include the permission P2. Nevertheless, the code frame 604 has executed an "Assert" override with respect to permission P2 in the illustrated call chain.

Therefore, although the permission grant object 614 does provide the permission P2, the Assert override terminates the stack walk operation at the permission grant object 614 and satisfies the demand by the permission request object 608 for the requested permission P2, without determining whether the permission grant object 612 also satisfies the demand. In any event, the called code frame 602 is permitted to perform the protected operation because requested permission P2 was asserted to be satisfied up the remainder of the call chain.

It should be understood that the scenarios discussed with regard to FIGS. 5 and 6 need not be implemented together. Each stack override or permission combination may be employed individually or in any combination within the scope of the present invention.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

We claim:

1. A method of determining whether a requested permission, wherein the permission is at least one of a set of permissions, requested by a called code frame, is satisfied within a runtime call stack so as to allow the called code frame to perform a protected operation, the method comprising:
   associating a first permission grant object with a first code assembly in the runtime call stack;
   dynamically overriding the set of permissions that is assigned to a second permission grant object associated with a second code assembly preceding the first code assembly;
   creating a permission request object within the called code frame to demand the requested permission;
   demanding via the permission request object the requested permission from the first permission grant object to allow the called code frame to perform the protected operation;
   determining whether the requested permission is provided in association with the first code assembly by the first permission grant object, responsive to the demanding operation; and
   permitting the execution of the called code frame to perform the protected operation, if the requested permission is provided in association with the first code assembly, whereby a full walk of the runtime call stack may be avoided.

2. The method of claim 1 wherein the called code frame is included within the first code assembly.

3. The method of claim 1 wherein the called code frame is included within a lower level code assembly following the first code assembly in the runtime call stack.

4. The method of claim 1 further comprising:
   associating a second permission grant object with a second code assembly loaded in the runtime call stack, the second code assembly preceding the first code assembly in the runtime call stack.

5. The method of claim 4 further comprising:
   determining whether the requested permission is provided in associating with the second code assembly by the second permission grant object.

6. The method of claim 1 wherein the operation of dynamically overriding comprises:
   asserting within the first code assembly that a permission grant object associated with the at least one other code assembly preceding the first code assembly need not be evaluated to determine whether a specified permission is satisfied in association with the other code assembly in the runtime call stack, regardless of whether the specified permission is provided by the permission grant object associated with the other code assembly; and
   permitting execution of the called code frame to perform the protected operation, if the requested permission is a subset of the specified permission.

7. The method of claim 1 wherein the operation of dynamically overriding comprises:
   asserting within the first code assembly that a permission grant object associated with the at least one other code assembly preceding the first code assembly does not satisfy a specified permission within the runtime call stack, regardless of whether the specified permission is provided by the permission grant object associated with the other code assembly; and preventing execution of the called code frame to perform the protected operation, if the requested permission is a subset of the specified permission.

8. The method of claim 1 wherein the operation of dynamically overriding comprises:

asserting within the first code assembly that a permission grant object associated with the at least one other code assembly preceding the first coded assembly satisfied only one or more specified permissions, regardless of whether one or more other permissions are also provided by the permission grant object associated with the other code assembly; and permitting execution of the called code frame to perform the protected operation, only if the requested permission is a subset of the specified permissions.

9. The method of claim 1 wherein the permission object encoded in the code assembly and the corresponding permission object encoded in the permission grant object satisfy a common permission interface.

10. The method of claim 1 wherein the operation of associating a first permission grant object with a first code assembly comprises:

associating the first permission grant object with an individual method of the first code assembly.

11. The method of claim 1 wherein the operation of associating a first permission grant object with a first code assembly comprises;

associating the first permission grant object with an individual class of the first code assembly.

12. The method of claim 1 wherein the operation of associating a first permission grant object with a first code assembly comprises:

associating the first permission grant object with an individual module of the first code assembly.

13. A method determining whether a requested permission, requested by a called code frame, is satisfied within a runtime call stack so as to allow the called code frame to perform a protected operation, the method comprising:

associating a first permission grant object with a first code assembly in the runtime call stack;

associating a second permission grant object with a second code assembly in the runtime call stack;

computing a first intersection of permissions provided by the first permission grant object and the second permission grant object;

recording the first intersection of permissions to provide a cached permission intersection;

demanding the requested permission; and permitting execution of the called code frame if the requested permission is a subset of the cached permission intersection, whereby a full walk of the runtime call stack may be avoided.

14. The method of claim 13 further comprising:

associating a third permission grant object with a third code assembly in the runtime call stack;

computing a second intersection of permissions provided by the first permission grant object, the second permission grant object, and third permission grant object; and recording the second intersection of permissions to provide the cached permission intersection.

15. The method of claim 13 wherein the called code frame is included within the first code assembly.

16. The method of claim 13 wherein the called code frame is included within a lower level code assembly following the first code assembly in the runtime call stack.

17. The method of claim 13 wherein the operation of associating a first permission grant object with a first code assembly comprises;

associating the first permission grant object with an individual method of the first code assembly.

18. The method of claim 13 wherein the operation of associating a first permission grant object with a first code assembly comprises:

associating the first permission grant object with an individual class of the first code assembly.

19. The method of claim 13 wherein the operation of associating a first permission grant object with a first code assembly comprises:

associating the first permission grant object with an individual module of the first code assembly.

20. A runtime system for determining whether a requested permission of a set of permissions, requested by a called code frame, is satisfied within a runtime call stack so as to allow the called code frame to perform a protected operation, the runtime system comprising:

a first code assembly loaded into the runtime call stack;

a first permission grant object associated with the first code assembly comprising one or more permissions available to the first code assembly; and a first permission request object created by the called code frame requesting the requested permission from the first permission grant object, wherein the called code frame is permitted to execute the protected operation if the first permission request object determines from the permission grant object that the requested permission is satisfied by the first code assembly and wherein the permission set is dynamically overridden to modify one permission within the set of permissions and whereby a full walk of the runtime call stack may be avoided.

21. The runtime system of claim 20 wherein the called code frame is included within the first code assembly.

22. The runtime system of claim 20 wherein the called code frame is included within a lower level code assembly following the first code assembly in the runtime call stack.

23. The runtime system of claim 20 wherein the first permission grant object is associated with an individual method of the first code assembly.

24. The runtime system of claim 20 wherein the first permission grant object is associated with an individual class of the first code assembly.

25. The runtime system of claim 20 wherein the first permission grant object is associated with an individual module of the first code assembly.

26. A runtime system for determining whether a requested permission, requested by a called code frame, is satisfied within a runtime call stack so as to allow the called code frame to perform a protected operation, the runtime system comprising:

a first permission grant object associated with a first code assembly in the runtime call stack;

a second permission grant object associated with a second code assembly in the runtime call stack; and a cache storing an intersection of permissions provided by the first permission grant object and the second permission grant object, wherein execution of the called code frame is permitted and a full walk of the runtime call stack may be avoided if the requested permission is a subset of the cached permission intersection.

27. The runtime system of claim 26 wherein the intersection is computed and stored in the cache before the requested permission is requested.

28. A computer program product encoding a computer program for determining whether a requested permission, wherein the permission is at least one of a set of permissions, requested by a called code frame, is satisfied within a runtime call stack so as to allow the called code frame to perform a protected operation, the computer process comprising:
associating a permission grant object with a first code assembly in the runtime call stack;
dynamically overriding the set of permissions that is assigned to the assembly associated with at least one other code assembly preceding the first code assembly;
creating a permission request object within the called code frame to demand the requested permission;
demanding via the permission request object the requested permission from the permission grant object to allow the called code frame to perform the protected operation;
determining whether the requested permission is provided in association with the first code assembly by the permission grant object, responsive to the demanding operation; and
permitting execution of the called code frame to perform the protected operation whereby a full walk of the runtime call stack may be avoided, if the requested permission is provided in association with the first code assembly.

29. The computer program product of claim 28 wherein the called code frame is included within the first code assembly.

30. The computer program product of claim 28 wherein the called code frame is included within a lower level code assembly following the first code assembly in the runtime call stack.

31. The computer program product of claim 28 wherein the computer process further comprises:
associating a second permission grant object with a second code assembly loaded in the runtime call stack, the second code assembly preceding the first code assembly in the runtime call stack.

32. The computer program product of claim 31 wherein the computer process further comprises;
determining whether the requested permission is provided in association with the second code assembly by the second permission grant object.

33. The computer program product of claim 28 wherein the operation of dynamically overriding comprises:
asserting within the first code assembly that a permission grant object associated with at least one other code assembly preceding the first code assembly need not be evaluated to determine whether a specified permission is satisfied in association with the other code assembly in the runtime call stack, regardless of whether the specified permission is provided by the permission grant object associated with the other code assembly; and
permitting execution of the called code frame to perform the protected operation, if the requested permission is a subset of the specified permission.

34. The computer program product of claim 28 wherein the operation of dynamically overriding comprises:
asserting within the first code assembly that a permission grant object associated with the at least one other code assembly preceding the first code assembly does not satisfy a specified permission within the runtime call stack, regardless of whether the specified permission is provided by the permission grant object associated with the other code assembly; and
preventing execution of the called code frame to perform the protected operation, if the requested permission is a subset of the specified permission.

35. The computer program product of claim 28 wherein the operation of dynamically overriding comprises:
asserting within the first code assembly that permission grant object associated with the at least one other code assembly preceding the first code assembly satisfies only one or more specified permissions, regardless of whether one or more other permissions are also provided by the permission grant object associated with the other code assembly; and
permitting execution of the called code frame to perform the protected operation, only if the requested permission is a subset of the specified permissions.

36. The computer program product of claim 28 wherein the permission object encoded in the code assembly and the corresponding permission object encoded in the permission grant object satisfy a common permission interface.

37. The computer program product of claim 28 wherein the operation of associating a permission grant object with a first code assembly comprises;
associating the first permission grant object with an individual method of the first code assembly.

38. The computer program product of claim 28 wherein the operation of associating a permission grant object with a first code assembly comprises:
associating the first permission grant object with an individual class of the first code assembly.

39. The computer program product of claim 28 wherein the operation of associating a permission grant object with a first code assembly comprises:
associating the first permission grant object with an individual module of the first code assembly.

40. A computer program product encoding a computer program for determining whether a requested permission, requested by a called code frame, is satisfied within a runtime call stack so as to allow the called code frame to perform a protected operation, the computer process comprising:
associating a first permission grant object with a first code assembly in the runtime call stack;
associating a second permission grant object with a second code assembly in the runtime call stack;
computing a first intersection of permissions provided by the first permission grant object and the second permission grant object;
recording the first intersection of permissions to provide a cached permission intersection; and
permitting execution of the called code frame if the requested permission is a subset of the cached permission intersection, whereby a full walk of the runtime call stack may be avoided.

41. The computer program product of claim 40 wherein the computer process further comprises:
associating a third permission grant object with a third code assembly in the runtime call stack;
computing a second intersection of permissions provided by the first permission grant object, the second permission grant object, and the third permission grant object; and
recording the second intersection of permissions to provide the cached permission intersection.

42. The computer program product of claim 40 wherein the called code frame is included within the first code assembly.

43. The computer program product of claim 40 wherein the called code frame is included within a lower level code assembly following the first code assembly in the runtime call stack.

44. The computer program product of claim 40 wherein the operation of associating a first permission grant object with a first code assembly comprises:
   associating the first permission grant object with an individual method of the first code assembly.

45. The computer program product of claim 40 wherein the operation of associating a first permission grant object with a first code assembly comprises:
   associating the first permission grant object with an individual class of the first code assembly.

46. The computer program product of claim 40 wherein the operation of associating a first permission grant object with a first code assembly comprises:
   associating the first permission grant object with an individual module of the first code assembly.

\* \* \* \* \*